United States Patent [19]

Grube et al.

[11] Patent Number: 5,371,898
[45] Date of Patent: * Dec. 6, 1994

[54] METHOD FOR A COMMUNICATION UNIT TO OPERATE IN EITHER A TRUNKING OR A CELLULAR COMMUNICATION SYSTEM

[75] Inventors: Gary Grube, Palatine, Ill.; Jaime A. Borras, Hialeah, Fla.; Richard Comroe, Dundee, Ill.

[73] Assignee: Motorola, Inc., Schaumburg, Ill.

[ * ] Notice: The portion of the term of this patent subsequent to Jan. 12, 2010 has been disclaimed.

[21] Appl. No.: 724,282

[22] Filed: Jul. 1, 1991

Related U.S. Application Data

[63] Continuation-in-part of Ser. No. 608,878, Nov. 5, 1990, Pat. No. 5,179,721.

[51] Int. Cl.⁵ ............... H04Q 7/00; H04B 1/38; H04B 17/00
[52] U.S. Cl. ............ 455/33.1; 455/34.1; 455/67.1; 455/89; 455/56.1; 379/59
[58] Field of Search ......... 455/14, 17, 33.1, 33.4, 455/51.1, 56.1, 74, 76–77, 89; 379/58–59

[56] References Cited

U.S. PATENT DOCUMENTS

| | | | |
|---|---|---|---|
| 4,347,625 | 8/1982 | Williams | 455/17 |
| 4,553,262 | 11/1985 | Coe | 455/17 |
| 4,802,235 | 1/1989 | Treatch | 455/76 |
| 4,972,455 | 11/1990 | Phillips et al. | 455/76 |
| 5,058,199 | 10/1991 | Grube | 455/56.1 |
| 5,095,529 | 3/1992 | Comroe et al. | 455/17 |
| 5,179,721 | 1/1993 | Grube et al. | 455/33.1 |

Primary Examiner—Curtis Kuntz
Assistant Examiner—Andrew Faile
Attorney, Agent, or Firm—Timothy W. Markison

[57] ABSTRACT

A communication unit may operate in either a trunking communication system and a cellular communication system when the coverage areas of each system overlap. Typically, the communication unit is affiliated with the trunking communication system and operates normally therein. When a call is received or being placed via the cellular communication system, the communication unit transfers its affiliation to the cellular communication system and operates therein. The communication unit is prompted by the trunking communication system to transfer its affiliation for incoming calls and does so automatically for outgoing calls. Once the communication ends, the communication unit transfers its affiliation back to the trunking communication system within a predetermined period of time.

13 Claims, 2 Drawing Sheets

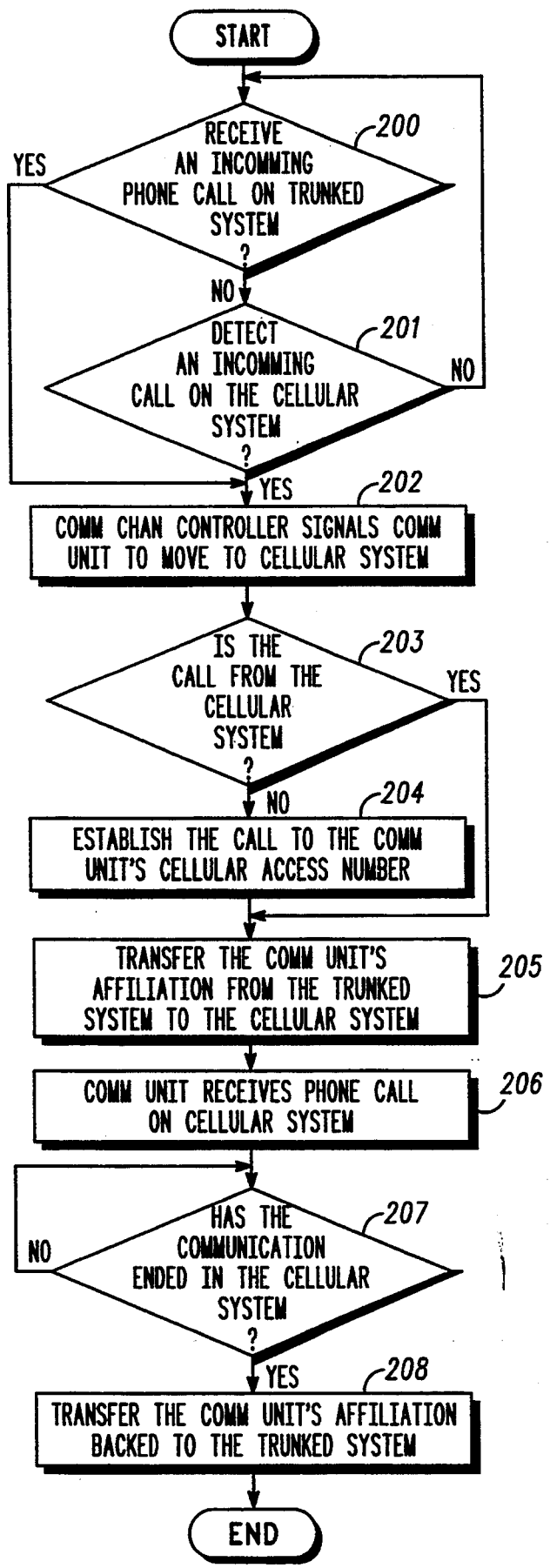

METHOD FOR A COMMUNICATION UNIT TO OPERATE IN EITHER A TRUNKING OR A CELLULAR COMMUNICATION SYSTEM

This a continuation in part of a pending patent application Ser. No. 07/608,878, filed on Nov. 5, 1990, now U.S. Pat. No. 5,179,721 entitled A Method For Inter Operation Of A Cellular Communication System and A Trunking Communication System.

FIELD OF THE INVENTION

This invention relates generally to communication systems and in particular to a method that allows a communication unit to operate in either a trunking communication system or a cellular communication system.

BACKGROUND OF THE INVENTION

The basic operation and structure of trunking communication systems and cellular telephone communication systems (cellular communication systems) are known. Trunking communication systems typically comprise a communication channel controller, a limited number of repeaters that transceive information via communication channels, and a plurality of communication units which may be mobile vehicle radios and/or portable radios. Of the communication channels, one is typically chosen to be a control channel. The control channel typically transceives operational information between the communication channel controller and the plurality of communication units such that, for example, the plurality of communication units can access the communication channels. Typically, the trunking communication system has a relatively large geographic coverage area. Depending on the environment that the trunking communication system is located, the coverage area may be approximately 35 miles in radius or greater.

A cellular communication system typically comprises a mobile telephone switching office (MTSO), a plurality of cells, a limited number of communication channels, and a plurality of communication units which may be cellular telephones. Each of the plurality of cells comprises some of the limited number of communication channels, wherein one of the communication channels is designated as the control channel for that cell. The control channel transceives operational information between the plurality of communication units within the cell and the MTSO such that the communication units can place telephone calls via a phone system such as the Public Switched Telephone Network (PSTN). Typically, the coverage area of each cell is relatively small in comparison with that of a typical trunking system. For example, a typical cell coverage area may vary from 2 miles to 10 miles in radius. Because an individual cell coverage area is relatively small, the limited number of communication channels may be reused, at least once, within a geographic region of approximately the same size as a trunking communication system.

Trunking communication systems efficiently support group dispatch which allows multiple communication units to simultaneously access one communication channel. Trunking communications systems may also support individual telephone calls, however, individual calls are an inefficient use of a communication channel due to the large coverage area. In contrast, cellular communications systems are relatively efficient at providing individual telephone calls for communication units because of various communication channel re-use schemes employed. The communication channel re-use schemes allow multiple calls to simultaneously proceed while using the same communication channel. However, cellular communication systems are relatively inefficient at providing group dispatch due to the small coverage area of the cells.

Due to the different configurations of a trunking communication system and a cellular communication system, a typical communication unit, without two receivers and two transmitters, cannot operate in both communication systems. Having two receivers and transmitters adds considerable expense to manufacturing and purchasing of a communication units, thus, for practical reasons, most communication units have only one receiver and one transmitter. However, recent advances in technology have expanded the bandpass of the receivers and transmitters in communication units such that a communication unit is able to transceive in either system. (Note that presently the FCC has designated for a trunking communication system, the frequency range of 806 to 821 Mhz as the transmit region and the frequency range of 850 to 865 Mhz as the receive region, and, for a cellular communication system, the frequency range of 824 through 849 Mhz as the transmit region and 869 to 894 Mhz for the receive region.)

Even with the expanded bandpass of the receiver and transmitter, a typical communication unit is limited to operating in one system at a time due to their technological limitations. Within the receiver, a mixer mixes a received signal with a local oscillator to produce an intermediate signal. The intermediate signal is passed through a bandpass filter which substantially filters out all but one signal at a time which eliminates signals transmitted by the other communication system. The transmitter is limited for similar reasons.

Another limitation that impedes communication units from operating in both systems is that, in many cases, a trunking communication system and a cellular communication system within the same geographic area may be manufactured by different manufacturers. This presents a limitation in that typically one manufacturer does not know, or cannot use, the signalling protocol of the other, which makes accessing that system very difficult.

Therefore, a need exists for a method that will allow a communication unit having one receiver and one transmitter to operate in either a trunking communication system or a cellular communication system, wherein switching from one system to the other will be done transparent to a user of the communication unit regardless of the manufacturers of the systems.

SUMMARY OF THE INVENTION

These needs and others are substantially met by the method for a communication unit to operate in either a cellular communication system or a trunking communication system disclosed herein. In a geographic region that contains a trunking communication system and a cellular communication system, wherein the trunking communication and the cellular communication system have substantially overlapping coverage areas and the trunking communication system is operably coupled to the cellular communication system, a method is presented which allows a communication unit to operate in either system. Typically, the communication unit monitors a control channel of the trunked communication system for call activity. When the communication unit detects a transfer affiliation message, it transfers affiliation from the trunked communication system to the cellular communication system, when the communication unit is inactive. Once affiliated with the cellular communication system, the communication unit monitors a control channel of the cellular communication system for its cellular system access number.

BRIEF DESCRIPTION OF THE DRAWINGS

FIG. 2 illustrates a logic diagram that may be used to implement the present invention.

DESCRIPTION OF A PREFERRED EMBODIMENT

Figure 1:
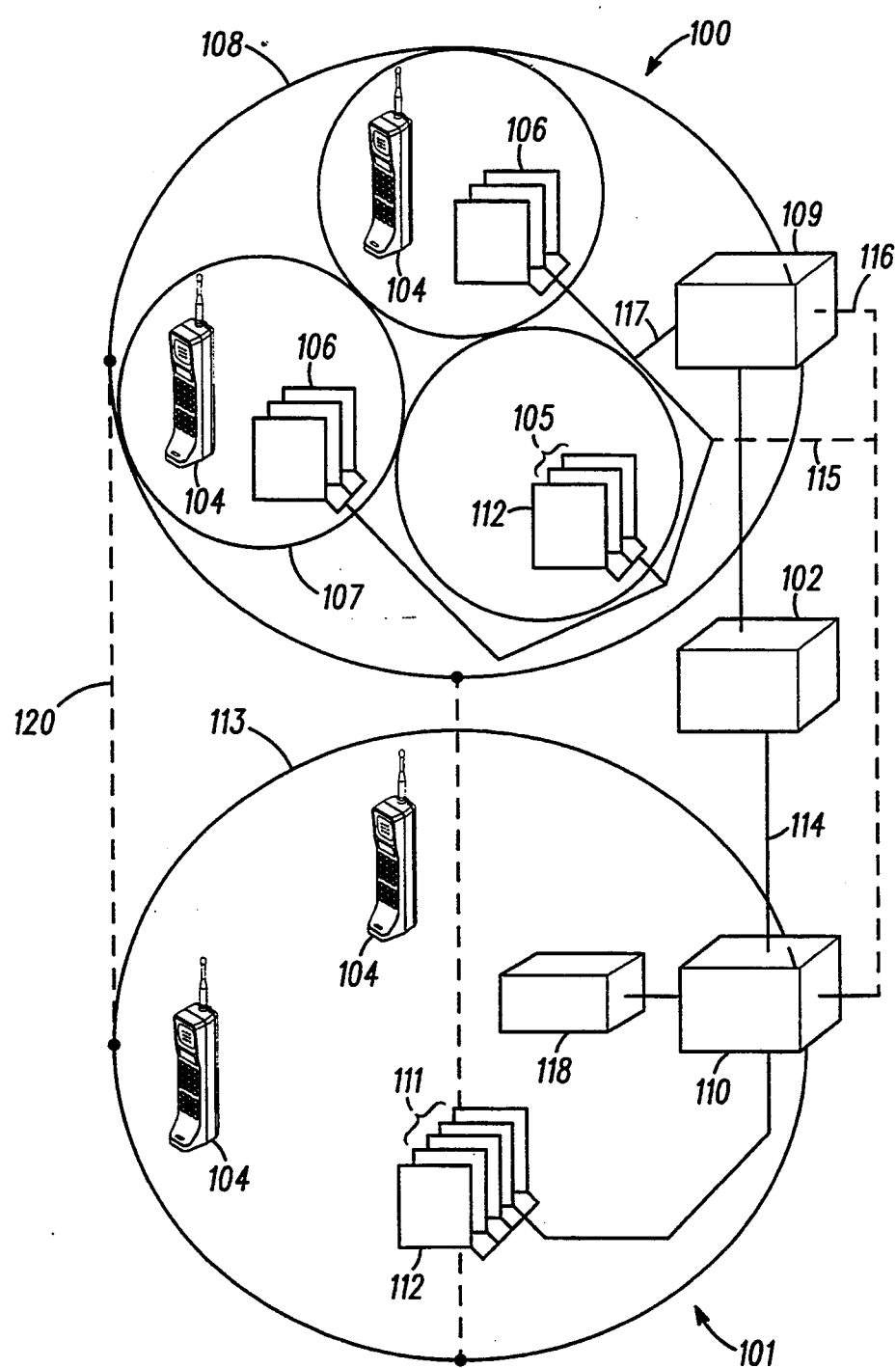
FIG. 1 illustrates a cellular communication system and a trunked communication system each having substantially the same coverage areas in accordance with the present invention.

FIG. 1 illustrates a trunking communication system 101 and a cellular communication system 100 operably coupled together in accordance with the present invention. The cellular communication system 100 comprises a mobile telephone switching office (MTSO) 109 and a plurality of cells 103 (3 shown), where each cell is operably coupled to the MTSO 109 and has a specific coverage area 107. Each cell comprises a limited number of communication channels 105, which may be carrier frequencies, frequency pairs, and/or time division multiplexing (TDM) slots, wherein one of the communication channels is designated a control channel 106. The summation of the coverage areas of each cell 107 comprises the coverage area of the cellular communication system 108. The cellular communication system also comprises a plurality of communication units 104 (2 shown), where the communication units are equipped with one receiver and transmitter that has adequate bandwidth to operate in both the trunking communication system and the cellular communication system.

The trunking communication system (101) comprises a communication channel controller 110, a plurality of communication channels 111, wherein one of the communication channels is designated a control channel 112, the plurality of communication units 104 and a cellular receiver 118. The coverage area of the trunking communication system 113 substantially overlaps 120, and may be approximately equal to, the coverage area of the cellular communication system 108, however, for illustrative purposes the coverage areas of each system are shown separately.

The trunking communication system 101 is operably coupled to the cellular communication system by one of three methods. The first and most convenient method, especially when the communication systems are manufactured by different manufacturers, is to couple the subsystems together through a phone line 114 or a plurality of phone lines, to a phone system 102. This coupling method allows the trunking communication system to transfer messages to the cellular communication system by placing telephone calls to the cellular communication system via the telephone system 102. An alternative method, is to directly connect the communication channel controller 110 to the MTSO 109 by a direct connection 116. Finally, if the communication systems are manufactured by the same manufacturer, or an agreement exists between manufacturers, the communication channel controller 110 may be coupled directly into the communication channel links 117 of the cellular communication system by a coupling link 115 that is similar to a telephone link.

Generally, in accordance with this invention, communication units monitor control channels of the trunked communication system and are operating as trunked dispatch communications units. When a particular communication unit is needed for a dispatch communication within the trunking communication system, the communication channel controller 110 signals the communication unit over the control channel 112. When a particular communication unit desires to place a telephone call it leaves the trunking system control channel 112 and seeks out any control channel 106 of the cellular communications system. At this point the communication unit proceeds to make a telephone call through the cellular communication system. When that call concludes, the communication unit returns to the trunking communication system by finding its control channel 112.

When a particular communication unit is to receive an individual call within the trunking communication system, the communication channel controller 110 signals the communication unit to transfer its affiliation to the cellular communication system. The communication channel controller 110 also transfers the individual call to the cellular system communication system by transferring the call to the cellular system access number associated with the target communication unit. When the communication unit moves to the cellular communication system it will receive the individual call in a typical cellular communication system fashion. When that call concludes, the communication unit returns to the trunking communication system by finding its control channel 112.

When a particular communication unit has an incoming telephone communication within the cellular communication system, the MTSO 109 transmits a call page on the control channel of each cell, where the call page includes the cellular system access number of the particular communication unit. The cellular receiver 118 receives and decodes the call page and forwards it to the communication channel controller 110. The controller 110 cross-references an internal database for a corresponding trunking system identification number. If one is found, the controller 110 signals the particular communication unit to transfer its affiliation to the cellular communication system to receive its call. When the call concludes, the communication unit returns to the trunking communication system by finding its control channel 112 to re-affiliate with the trunking communication system.

The present invention is described in more detail with reference to FIG. 2 which illustrates a logic diagram of the present invention. The following process is readily programmable into existing hardware of the communication channel controller, however, some controllers may require additional memory and computing devices. At step 200, the communication channel controller 110 determines whether a communication unit has an incoming telephone interconnect communication within the trunking communication system. This is carried out within the communications channel controller when it receives an incoming call via the telephone line 114 from the phone system 102 as with a typical stand alone trunking communication system.

If a call is not being received via the trunking communication system, the communication channel controller 110 determines whether a communication unit has an incoming telephone call within the cellular communication system 201. The controller determines if a communication unit has an incoming call in the cellular system by in one or more methods. The communications controller 110 may receive cellular call pages, or call activity information, directly from the cellular MTSO 109 by way of a data link 116. Alternatively, the controller may receive the call pages from a data link 115 which connects the controller directly to the cellular system cell sites 103. Another alternative is to receive the call pages from the MTSO 109 through the phone system 102 over the phone line 114. Yet another alternative is to receive the call pages the cellular receiver 118. As previously mentioned, the cellular receiver monitors the control channel information of the cellular communication system and transfers all incoming call pages to the controller. As in a typical cellular communication system, the call page contains the cellular system access number, phone number, of a communication unit. The controller takes the cellular system access number and cross-references with an internal database to see if it contains a corresponding trunking system identification number. The database may be any memory device capable of storing information such as a RAM. If the controller does not find a corresponding trunking system identification number or no calls are being received, the process repeats a step 200. If the controller finds a corresponding trunking system identification number, the process proceeds to step 202.

If an incoming call is detected in either the trunking communication system 200 or the cellular communication system 201, the targeted communication unit is instructed to transfer its affiliation to the cellular communication system 202. After the transfer affiliation message has been transmitted to the target communication unit 202, the controller determines which system the incoming call is coming from 203. If the call is coming from the trunking communication system, the controller transfers the call to the MTSO and determines the cellular access phone number of the target communication unit from the database 204. The call may be transferred to the MTSO by directing the phone system to transfer the caller to the cellular system access number of the target communication unit. This may require that the trunking communication system and MTSO be coupled to the same telephone switching office as is limited by today's art, however, it is conceivable that such service can be extended beyond one telephone switching office to avoid this restriction. Alternately, the call may be transferred by establishing a communications link directly to the MTSO. This method of transfer is actually best described as a conference call where the trunking communication channel controller conferences the caller, still on the original line with the line to the MTSO that will connected to the target communication unit's cell site by the MTSO.

Upon receiving the command to move to the cellular communication system, the communication unit of the present invention will transfer its affiliation from the trunking communication system to the cellular communication system 205. If the targeted communication unit—the unit that the incoming call is for—is actively involved in a communication within the trunking communication system, the communication unit will not transfer its affiliation and will appear to the calling party that the targeted communication unit is not answering the call. Actively involved in a communication, or call, in the trunking communication system comprises the typical functions within the system, such as accessing a communication channel, a phone line, or other communication medium.

Transferring a communication unit's affiliation primarily consists of changing the local oscillator frequency and corresponding channel bandwidth of the receiver and the transmitter such that the communication unit is either operable in the cellular band or the trunking band. It also entails sending the communication channel controller an affiliation message or de-affiliation message depending on whether the communication unit is entering or leaving the trunking communication system.

Once the particular communication unit is affiliated with the cellular communication system, the MTSO instructs the communication unit to move to a particular communication channel that contains the incoming phone call 206. The communication unit will remain affiliated with the cellular communication system as long as the communication remains active (207). Once the communication ends, which may be a predetermined period of time (0 to 20 seconds) after the cellular communication channel 105 is deassigned, the communication unit transfers its affiliation back to the trunking communication system and transfers an affiliation message to the controller 208. Once the communication unit is re-affiliated with the trunking communication system, the process can repeat again for this particular communication unit. Note that while this process is being engaged for one particular communication unit, multiple communication units may also be involved in a similar process. In addition, the present invention does not substantially interfere with independent operations of the trunking communication system or of the cellular communication system.

When a user of a communication unit desires to place a telephone call, the user simply dials the desired number as he would with any cellular telephone. When the user does this, the communication unit transfers its affiliation from the trunking communication system to the cellular communication system. Once affiliated with the cellular communication system, the communication unit places the telephone call request. The cellular communication system processes the call request as it would any other. When the call is over, the communication unit transfers its affiliation back to the trunking communication system as described above. Calls may be placed in the trunking communication system by activating a push-to-talk button, or similar process that generates an inbound signalling word (ISW) as in existing trunking communication systems.

We claim:

1. In a geographic region that contains at least one trunking communication system and at least one cellular communication system, wherein the trunking communication system and the cellular communication system have substantially overlapping coverage areas and the at least one trunking communication system is operably coupled to the at least one cellular communication system, a method for a communication unit to operate in either the at least one trunking communication system or the at least one cellular communication system, the method comprises the steps of:
   a) monitoring at least one control channel of the at least one trunking communication system;
   b) detecting a transfer affiliation message;
   c) transferring affiliation from the at least one trunking communication system to the at least one cellular communication system when the transfer affiliation message is detected and when the communication unit is not active in a communication within the at least one trunking communication system;

d) monitoring at least one control channel of the at least one cellular communication system; and e) receiving a communication via the at least one cellular communication system when the communication unit detects its cellular system access number.

2. The method of claim 1 further comprises, when the communication of step (e) ends, transferring affiliation from the at least one cellular communication system to the at least one trunking communication system within a predetermined period of time.

3. The method of claim 2 further comprises transmitting a re-affiliation message to a central controller of the at least one trunking communication system to inform the central controller of the at least one trunking communication system that the communication unit is now back in the at least one trunking communication system.

4. The method of claim 2 further comprises the steps of:

f) monitoring the at least one control channel of the at least one trunking communication system for communication unit's trunking system identification number;

g) detecting the communication unit's trunking system identification number; and h) receiving a communication when the trunking system identification number is detected.

5. In the method of claim 1, step (c) further comprises:

i) transmitting a de-affiliation message to the trunking communication system; and ii) adjusting a receiver and a transmitter of the communication unit to transceive within a cellular communication system frequency range.

6. In the method of claim 1, step (c) further comprises adjusting a receiver and a transmitter of the communication unit to transceive within a cellular communication system frequency range.

7. In the method of claim 1, step (e) further comprises notifying the at least one trunking communication system of the communication within the at least one cellular communication system.

8. The method of claim 1 further comprises:

f) initiating a communication in the at least one cellular communication system by an operator of the communication unit; and g) transferring affiliation from the at least one trunking communication system to the at least one cellular communication system upon initiation of the communication.

9. In a geographic region that contains at least one trunking communication system and at least one cellular communication system, wherein the at least one trunking communication system and the at least one cellular communication system have substantially overlapping coverage areas, the at least one trunking communication system is operably coupled to the at least one cellular communication system, and a plurality of communication units primarily monitor a control channel of the at least one trunking communication system, a method for a communication channel controller of the at least one trunking communication system to provide access to either the at least one trunking communication system or the at least one cellular communication system for the plurality of communication units, the method comprises the steps of:

a) determining that at least one of the plurality of communication units is targeted for an incoming telephone communication within the at least one cellular communication system; and b) transmitting a transfer affiliation message to the at least one communication unit of the plurality of communication units.

10. In the method of claim 9, step (a) further comprises determining that at least one of the plurality of communication units is targeted for an incoming telephone communication within the at least one cellular communication system when a cellular system access number of the communication unit is received via an operational coupling between the at least one cellular communication system and the at least one trunking communication system.

11. In the method of claim 9, step (a) further comprises:

i) receiving a cellular system incoming call message from the at least one cellular communication system, wherein the cellular system incoming call message contains a cellular system access number of a communication unit;

ii) accessing a database to determine whether the cellular system access number correlates with a trunking system identification number of the at least one communication unit of the plurality of communication units;

iii) determining that the at least one communication unit of the plurality of communication units is targeted for a communication within the at least one cellular communication system when the cellular system access number corresponds the trunking system identification number.

12. The method of claim 9 further comprises re-affiliating the at least one of the plurality of communication units to the at least one trunking communication system when the incoming telephone communication within the at least one cellular communication system has ended.

13. The method of claim 12 further comprises re-affiliating the at least one of the plurality of communication units with the at least one trunking communication system upon receiving a re-affiliation message from the at least one of the plurality of communication units.

* * * * *